Feb. 10, 1959 R. TRIPMACHER ET AL 2,873,102
METHOD OF MELTING METAL
Original Filed Nov. 24, 1953
2 Sheets-Sheet 1

INVENTOR
RICHARD TRIPMACHER
KARL LEUPOLD

ATTORNEY

INVENTORS
RICHARD TRIPMACHER
KARL LEUPOLD

United States Patent Office 2,873,102
Patented Feb. 10, 1959

2,873,102

METHOD OF MELTING METAL

Richard Tripmacher and Karl Leupold, North Rhine-Westphalia, Germany

Continuation of application Serial No. 394,154, November 24, 1953. This application November 8, 1956, Serial No. 621,124

4 Claims. (Cl. 263—52)

The present invention relates to improved method of melting metal in an oscillating furnace or the like, and, more particularly, for melting shavings and wastes of light metal and light metal alloys in a simple, efficient, and economical manner.

This application is a continuation of our copending application, Serial No. 394,154, filed November 24, 1953, now Patent No 2,783,990, dated March 5, 1957.

In the methods heretofore employed, it has been customary to bring the waste material which is to be fed into the melting furnace into a feed chamber for the purpose of rapidly melting the metal. This feed or forechamber communicates with the melting chamber and the liquid metal is circulated continually through it from the melting chamber by means of a pump. Due to this circulation of the liquid metal through the freshly charged material to be melted, the high heat content of the liquid metal is transferred directly to the fresh material to be melted, so that circulation of the liquid metal through the feed chamber and the excess heat of the melting chamber, which is heated continuously, is economically utilized and a rapid melting of the material is produced.

Such a circulation of the molten metal by means of pumps is expensive, since it requires not only a continuous supervision of the metal circulation pumps but also the expense of supervising and maintaining these pumps in proper operative condition. It has been found that no matter how carefully such pumps are constructed, they are strongly attacked by the hot metal and have to be frequently changed and repaired. This results not only in high operating costs but also in frequent interruptions and inspections.

Accordingly, an important object of the present invention is to provide an efficient and improved method of melting the material, such as light metal and metal alloys, by means of melting the sensitive metal or material in an oscillating furnace without directly subjecting the fresh metal to either the high temperature of the waste gases or the heating flame. This is accomplished by initially placing the material to be treated into a feed chamber which communicates on opposite sides with spaced melting chambers, heating the material in the melting chambers and oscillating or rocking the furnace so that the fresh material, introduced into the feed chamber, is brought into constant contact with the molten metal as the latter circulates from one melting chamber to the other through the feed chamber during the oscillating movement of the furnace. The furnace is rocked about a central axis and on opposite sides of the feed chamber, so that the feed chamber communicates with both the melting chambers substantially in the transverse axis of swing of the furnace. The burners are located in each of the melting chambers, so that neither the flames nor the hot waste gases are brought in direct contact with the fresh metal or material.

A further object consists in covering the molten metal in the melting chambers with a purifying salt or the like, so as to isolate the molten metal from the combustion gases.

A still further object consists in submerging or dipping the fresh material in the feed chamber under the molten metal as the latter passes through the feed chamber, so as to insure intimate contact of the fresh material with the molten metal.

The melting furnace is rocked or oscillated at regular intervals, by any suitable means, so that the hot liquid or molten metal washes through the material freshly brought into the feed chamber and submerged under the surface of the molten metal. Thus, the fresh material is constantly being mixed with the molten material and quickly preheated and melted during the oscillating movement of the molten metal as it is transferred alternately from one melting chamber to the other.

In order to obtain a positive and thorough mixing of the fresh material with the molten material during the rocking movement of the furnace in accordance with the present method, the feed chamber is arranged so that it divides the melting furnace into two melting chambers, and is only connected with the melting chambers by two connecting openings or alternately this division may be made by a separating wall connected to the feed chamber. By use of such a separating wall, the feed chamber can also be arranged outside the actual melting furnace.

Referring to the drawings, in which is shown a preferred form of oscillating furnace for carrying out the present method:

Figure 1:
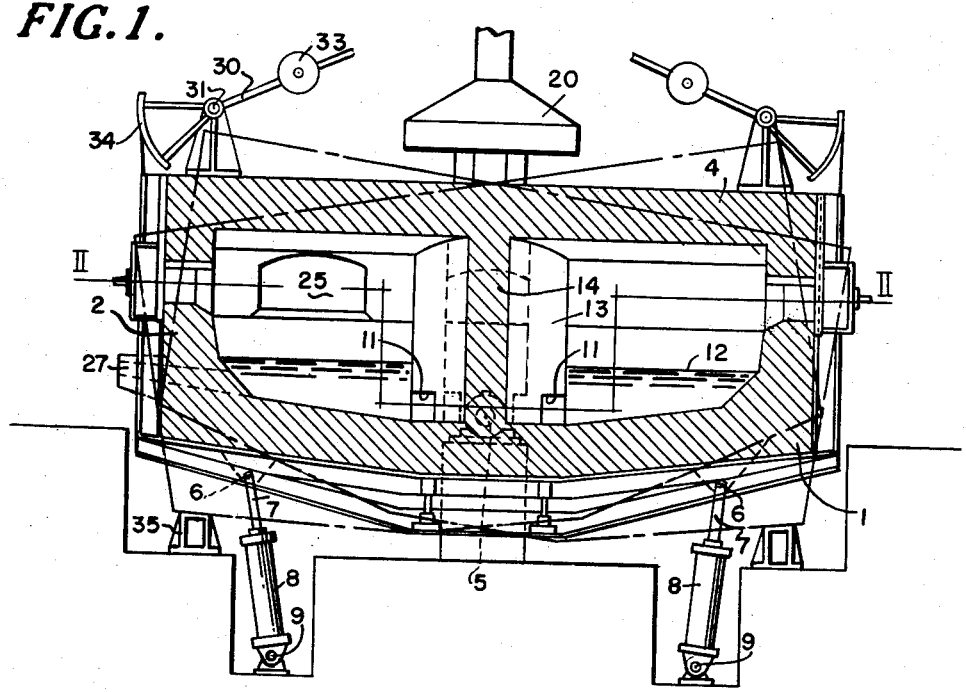
Figure 1 is a vertical longitudinal section through a melting furnace and taken substantially along the line 1—1 of Figure 2.
Figure 2:
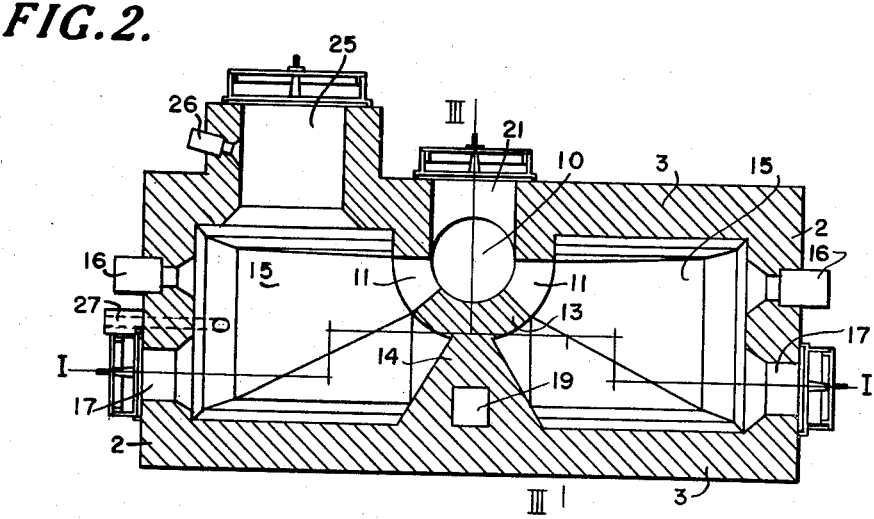
Figure 2 is a horizontal sectional view taken substantially along the line 2—2 of Figure 1.
Figure 3:
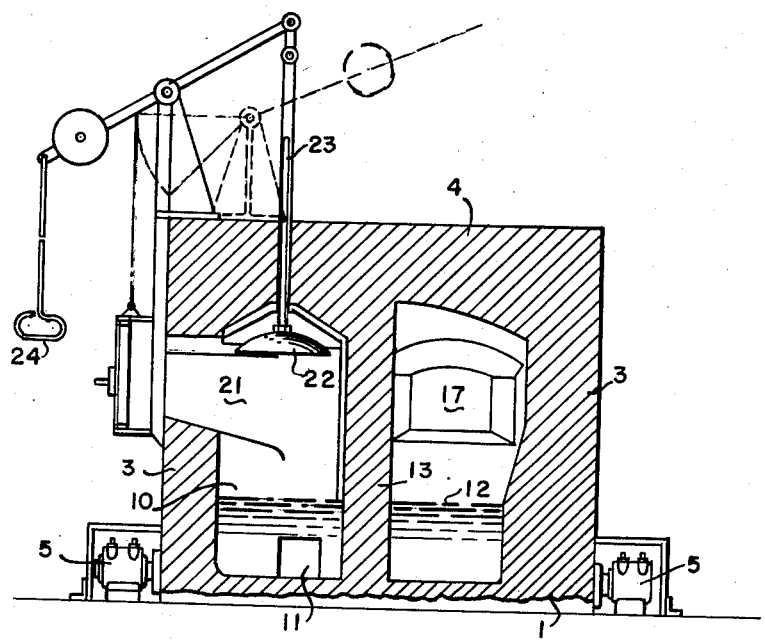
Figure 3 is a vertical cross section taken substantially along the line 3—3 of Figure 2, on an enlarged scale.

The melting furnace, as shown, is a gas or oil heated melting furnace but may be in the form of electrical heating device. The molten metal is carried on the floor 1 of the furnace, bordered or surrounded by the face walls 2 and the side walls 3 and closed at the top by a roof 4. The furnace is supported on both sides in bearings 5 located centrally in the lower part and at right angles to the longitudinal axis of the furnace. Beneath the floor, at both ends, are arranged eyes 6 to which are hinged the piston rods 7 of hydraulically or pneumatically operated pressure devices 8. The other end of each of the pressure devices 8 is hinged at 9.

A vertical feed chamber 10 is disposed in substantially the same plane as the rocking axis of the bearings 5. The feed chamber 10 is closed off from the inside of the melting furnace and only communicates with the fused metal through openings 11 below the level 12 of the fused metal. By means of a separating wall 14, connected with the curved wall 13 of the feed chamber 10 and the other side wall 3 of the furnace, the interior of the furnace is divided into two melting chambers 15. These melting chambers 15 communicate with each other through the openings 11 so as to insure the level of molten metal being the same in the feed chamber 10 as is in the chambers 15.

The furnace is heated by burners 16, arranged in the face walls 2, which heat the corresponding melting chambers 15. It will be noted that the heating means 16 are spaced or separated from the feed chamber, so that the fresh material is not brought into contact with the burners of the hot waste gases, but continuously mixes with the molten metal as the latter moves from one melting chamber to the other. By means of the closeable openings 17 arranged in the face walls 2, there may be applied to the surface of the molten metal a layer or covering in the form of a purifying salt which serves to isolate the molten metal from the combustion gases and prevent its burning or calcination. Spaced levers 30 are pivotally mounted as at 31 to brackets 32 on top of the furnace body 1. Adjustable counterweight members 33 are slidably mounted on the lever 30. Each of the levers 30 is also formed with a segmental portion 34 which is operatively connected by any suitable means to a door (not shown) for closing each of the openings 17. The exhaust gases pass through a vertical channel 19 arranged in the separating wall 14 and a widened exhaust hood 20 arranged above the top 4 of the furnace to the chimney.

The material to be melted is supplied to the feed chamber 10 through a closeable opening 21. In the feed chamber 10, above this feed opening, is arranged a dipping device 22 which is connected with a rod 23 passing through the roof of the furnace and is operated by a lever pull 24. After the material to be melted is fed into the chamber 10, the dipping device 22 is lowered so that the material fed into the feed chamber and is pressed or forced under the molten metal to be thoroughly mixed with the same.

By the alternate actuation, preferably at regular intervals of time, of the pressure members or devices 8, the furnace is rocked in opposite directions, as shown by dot-and-dash lines in Figure 1. During this rocking movement, the molten metal flows from one melting chamber 15 through the openings 11 and the feed chamber 10, into the other melting chamber 15. Thereby, the material, freshly brought into the feed chamber 10, is continuously washed or preheated by the hot liquid material in the two melting chambers 15, which is subjected to the heating action of the spaced burners 16. In this way, the fresh or cold material fed into the furnace is quickly melted without being exposed to the direct contact with the hot combustion gases or flames in the melting chambers.

The frequency of the rocking or tilting movement is suitably adjusted to the amount of heat necessary for the melting of the material, and may be controlled by the heat of the molten metal, and independently of the volume of molten metal.

In a side wall 3 of the furnace, there is an opening forming a chamber 25 through which, if necessary, large waste material may be introduced into the furnace and which would not go into the feed chamber 10. The feed chamber 25 is heated by a burner 26 arranged in the side wall of the opening 25. Spaced stop members 35 may be positioned so as to engage the bottom of the furnace 1 in order to limit the downward rocking movement thereof.

By means of a closeable casting nozzle 27 arranged in a face wall 2, a part of the molten material is fed into a casting pit, not shown in the diagrams, at certain intervals of time, after removal of the sealing and when tipped towards this side.

Thus, it will be seen that an improved and efficient method of melting metal and the like in an oscillating furnace is provided, in which the fresh material is constantly mixed with the molten metal as the latter is alternately transferred from one melting chamber to another and without subjecting the fresh material to either the heating flame or the high temperatures of the waste gases in the furnace. Further, the molten metal in the furnace may be subjected to the action of a purifying salt, that forms a layer or covering for preventing the burning of the molten material by the combustion gases.

We claim:

1. The herein described method of melting metal in two spaced chambers having a communicating passage therebetween, which consists in heating each of the chambers, simultaneously rocking the chambers in the same direction, and continuously feeding fresh material into the passage communicating with the chambers so that the molten material alternately passes from one chamber to the other and the fresh material is continuously mixed with the molten material as the latter moves from one chamber to the other so as to preheat the fresh material.

2. An improved method of melting material in a tiltable furnace as called for in claim 1 which includes the additional step of dipping the fresh material under the molten material as the latter passes through the communicating passage so as to insure intimate contact therewith.

3. An improved method of melting metals in a tiltable furnace as called for in claim 1 which includes the additional step of covering the molten material in the chambers with a layer of purifying salt.

4. An improved method of melting metal as called for in claim 3 which includes the additional step of withdrawing a portion of the molten material from the chambers at predetermined intervals.

References Cited in the file of this patent

UNITED STATES PATENTS

| | | |
|---|---|---|
| 96,905 | Fletcher et al. | Nov. 16, 1869 |
| 2,142,875 | Schmeller | Jan. 3, 1939 |
| 2,204,173 | Bowser | June 11, 1940 |